(12) United States Patent
Klassen et al.

(10) Patent No.: US 7,490,398 B1
(45) Date of Patent: Feb. 17, 2009

(54) METHODS FOR ASSEMBLING A DISK DRIVE USING ROBOTIC END EFFECTOR

(75) Inventors: Andrew S. Klassen, San Jose, CA (US); Kenneth Allen, Felton, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 325 days.

(21) Appl. No.: 11/359,694

(22) Filed: Feb. 22, 2006

(51) Int. Cl.
*G11B 5/127* (2006.01)
*H04R 31/00* (2006.01)

(52) U.S. Cl. .............. 29/603.04; 29/603.03; 29/603.06; 29/737; 294/2; 294/64.1; 360/294.4; 360/294.5; 360/294.6; 360/294.7; 700/245

(58) Field of Classification Search .............. 29/603.03, 29/603.04, 603.06, 703, 712, 742, 743, 759, 29/760, 833; 269/13, 14; 294/2, 64.1; 360/294.4–294.7; 414/222.12, 226.01; 700/245
See application file for complete search history.

(56) References Cited

U.S. PATENT DOCUMENTS

| 6,848,168 | B1 * | 2/2005 | Slife et al. ............... 29/603.03 |
| 2006/0283773 | A1 * | 12/2006 | Ho et al. ..................... 206/725 |

* cited by examiner

*Primary Examiner*—Paul D Kim
(74) *Attorney, Agent, or Firm*—Stuart B. Chinn, Esq.; Seed IP Law Group

(57) ABSTRACT

A robotic tool for assembling a portion of a disk drive includes a movable end effector that includes a first portion and a second portion that is movable relative to the first portion. The first portion may be configured to engage the actuator assembly and the second portion may be configured to engage the flex circuit connector. A controller may be provided to control the movable end effector, causing the end effector to pick up the head stack assembly in a first configuration, move the second portion of the end effector relative to the first portion thereof so as to articulate the head stack assembly into a second configuration that is different than the first configuration, and place the head stack assembly into the base.

15 Claims, 7 Drawing Sheets

METHODS FOR ASSEMBLING A DISK DRIVE USING ROBOTIC END EFFECTOR

BACKGROUND OF THE INVENTION

1. Field of the Invention

The present invention pertains to the field of disk drives. In particular, embodiments of the present invention relate to methods and systems for assembling disk drives.

2. Description of the Related Art

During assembly of a disk drive, a Head Stack Assembly (HSA) must be picked from a HSA shipping tray and placed into a Head Disk Assembly (HDA) or an intermediate fixture. Conventionally, this pick and place operation is carried out by manually picking up a HSA from a HSA shipping tray and manually placing the picked up HSA into the HDA or the intermediate fixture. Even through the workers are grounded, the incidence of damage to the HSA through electrostatic discharge (ESD), although reduced, is not eliminated.

The HSA typically includes a flex circuit that electrically couples the Flex Circuit Connector (FCC) to the tail stack of the HSA. The flex circuit may be formed of an electrically insulating material in which a plurality of electrical traces is embedded. Although the flex circuit is typically formed of relatively tough polyimide (sold by DuPont Inc. under the trade name Capton®, for example), it remains susceptible to scratches and abrasion damage. Such scratches may occur when the tail stack of the HSA contacts the flex circuit during shipment or when the HSA is placed into the disk drive during assembly. To reduce the incidence of such scratches, head stack assemblies are typically shipped in a HSA shipping tray in a configuration in which the flex circuit is held away from the tail stack of the HSA.

FIG. 1 shows a typical HSA shipping tray 102 in which HSAs are shipped. As shown, the HSA shipping tray 102 may be injection molded or may be a relatively inexpensive thermo-formed plastic tray that defines a plurality of recesses 104 shaped so as to receive a single HSA. For clarity of illustration only a single HSA 106 is shown received within one of the recesses 104. As shown, the HSA 106 may include a FCC 110 and a flex circuit 108. As shown, to avoid damaging the flex circuit 108 during shipping, the recesses within the HSA shipping tray are configured so as to keep the FCC 110 away from the actuator arms and the actuator body of the actuator assembly of the HSA 106.

FIG. 2 is a plan view of a portion of a HSA shipping tray 102, showing a HSA 106 fitted within one of the recesses 104 therein. As shown, the FCC 110 may be disposed within the HSA shipping tray 102 such that the flex circuit 108 is disposed apart from the tail stack 202 of the HSA 106. A distance 204 between the flex circuit 108 and tail stack 202 is chosen to be sufficiently large so as to significantly reduce the incidence of abrasion damage to the flex circuit 108—that is to prevent the tail stack 202 or other structures of the HSA 106 from coming into contact with the flex circuit 108 during both the shipping and assembly processes.

However, the HSAs, while shipped in a configuration that reduces the incidence of potentially yield-reducing abrasions to the flex circuit 108, are typically coupled to the base of a disk drive in a different configuration. FIG. 3 shows a head stack assembly 106 in this "coupling" configuration, enabling it to be coupled to the base 302 of a disk drive. When coupled to the base 302, the HSA 106 is often placed in a configuration in which the flex circuit 108 is comparatively closer to the actuator arms and actuator body of the actuator assembly of HSA 106 than it is when the HSA 106 is disposed within the HSA shipping tray 102. Solely to aid in visualizing the difference between the configuration of the HSA 106 when fitted within the HSA shipping tray 102 and the configuration of the HSA 106 when coupled to the disk drive base 302, the flex circuit 108 appears twice in FIG. 3. The flex circuit 108 shown in dashed lines illustrates the relative position of the flex circuit 108 when the HSA 106 is disposed within the HSA shipping tray 102. In contrast, the flex circuit 108 shown in solid lines represents the position thereof when the HSA 106 is placed within the disk drive base 302. As may be seen from this composite view, the flex circuit 108 is moved closer to the actuator arms and actuator body of the HSA 106 to place it into the disk drive base 302.

From the foregoing, it is apparent that the FCC 110 must be somehow articulated relative to the actuator assembly from its first configuration in the HSA shipping tray 102 to a second configuration suitable for placing it into a disk drive base 302. Manually picking up the HSAs from the HSA shipping tray does not completely obviate the risk of scratching the flex circuit. Indeed, in some shipping trays, the configuration of the HSA 106 in the shipping tray 102 is such that a person must pick up the HSA 106 by placing his or her fingertips within 0.5 inches of the tail stack 202. Under such circumstances, even the smallest human error can produce damage. What are needed, therefore, are methods and systems for effectively assembling a portion of a disk drive.

SUMMARY

An embodiment of the present invention is a method for assembling a portion of a disk drive using a robotic end effector. The disk drive includes a base and a head stack assembly, the head stack assembly including an actuator assembly, a flex circuit coupled to the actuator assembly and a flex circuit connector coupled to the flex circuit. The method may include steps of coupling the robotic end effector to the head stack assembly, the head stack assembly being disposed in a first configuration; articulating the robotic end effector, such that the head stack assembly is placed in a second configuration that is different than the first configuration; aligning the robotic end effector with the base; and placing the head stack assembly into the base.

The flex circuit connector may be closer to the actuator assembly in the second configuration than in the first configuration. The coupling step may include a step of coupling the robotic end effector to both the actuator assembly and the flex circuit connector. The actuator assembly may include a pivot assembly, and the coupling step may include steps of moving first and second fingers of the robotic end effector to mechanically grip the pivot assembly of the actuator assembly; and applying suction through the robotic end effector to the flex circuit connector. The robotic end effector may include a first portion and a second portion that is movable relative to the first portion. The coupling step may include steps of coupling the first portion of the robotic end effector to the actuator assembly; and coupling the second portion of the robotic end effector to the flex circuit connector. The articulating step may include a step of moving the second portion relative to the first portion to place the head stack assembly in the second configuration. The method may also include a step of merging the head stack assembly with opposing magnets of a voice coil motor after the coupling step and before the placing step. The articulating step may be carried out after the merging step.

Another embodiment of the present invention comprises a robotic tool for assembling a portion of a disk drive, the disk drive including a base and a head stack assembly. The head stack assembly may include an actuator assembly, a flex circuit coupled to the actuator assembly and a flex circuit connector coupled to the flex circuit. According to this embodiment, the robotic tool may include a movable end effector including a first portion and a second portion that is movable relative to the first portion, the first portion being configured to engage the actuator assembly and the second portion being configured to engage the flex circuit connector; a controller configured to control the movable end effector, the controller operable to cause the end effector to: pick up the head stack assembly in a first configuration, move the second portion of the end effector relative to the first portion thereof so as to articulate the head stack assembly into a second configuration that is different than the first configuration, and place the head stack assembly into the base.

The actuator assembly may include a pivot assembly, the first portion may include fingers configured to grip the pivot assembly, and the second portion may be configured to apply suction to the flex circuit connector. The robotic tool may also include an air merge nest that is configured to enable the head stack assembly to be merged with magnets of a voice coil motor. The controller may be further operable to cause the movable end effector to merge the head stack assembly with the magnets of the voice coil motor in the air merge nest before the head stack assembly is placed into the base.

DETAILED DESCRIPTION

Figure 4:
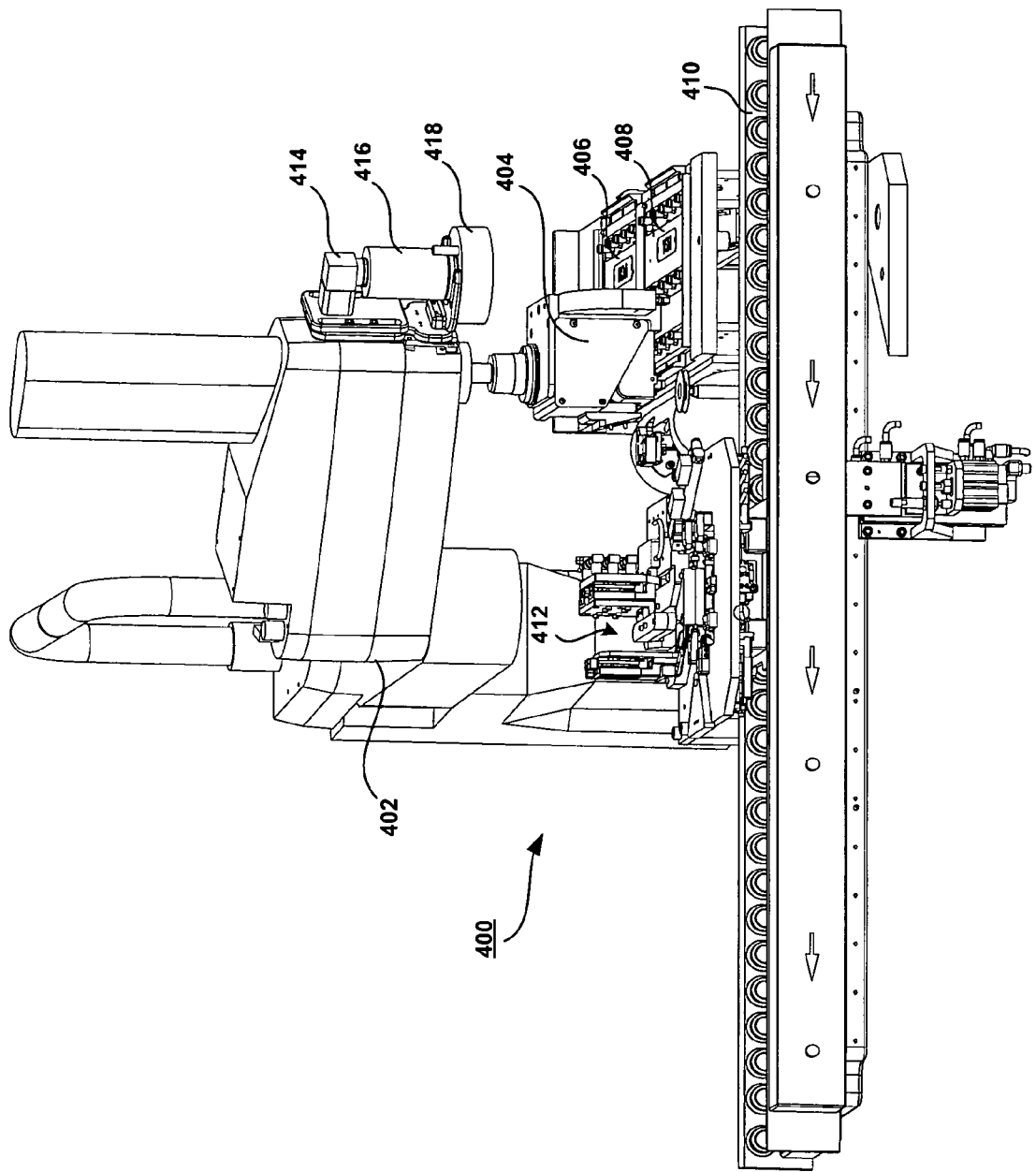
FIG. 4 shows a first view of a disk drive assembly station that includes a robotic tool for assembling a portion of a disk drive, according to an embodiment of the present invention.
Figure 5:
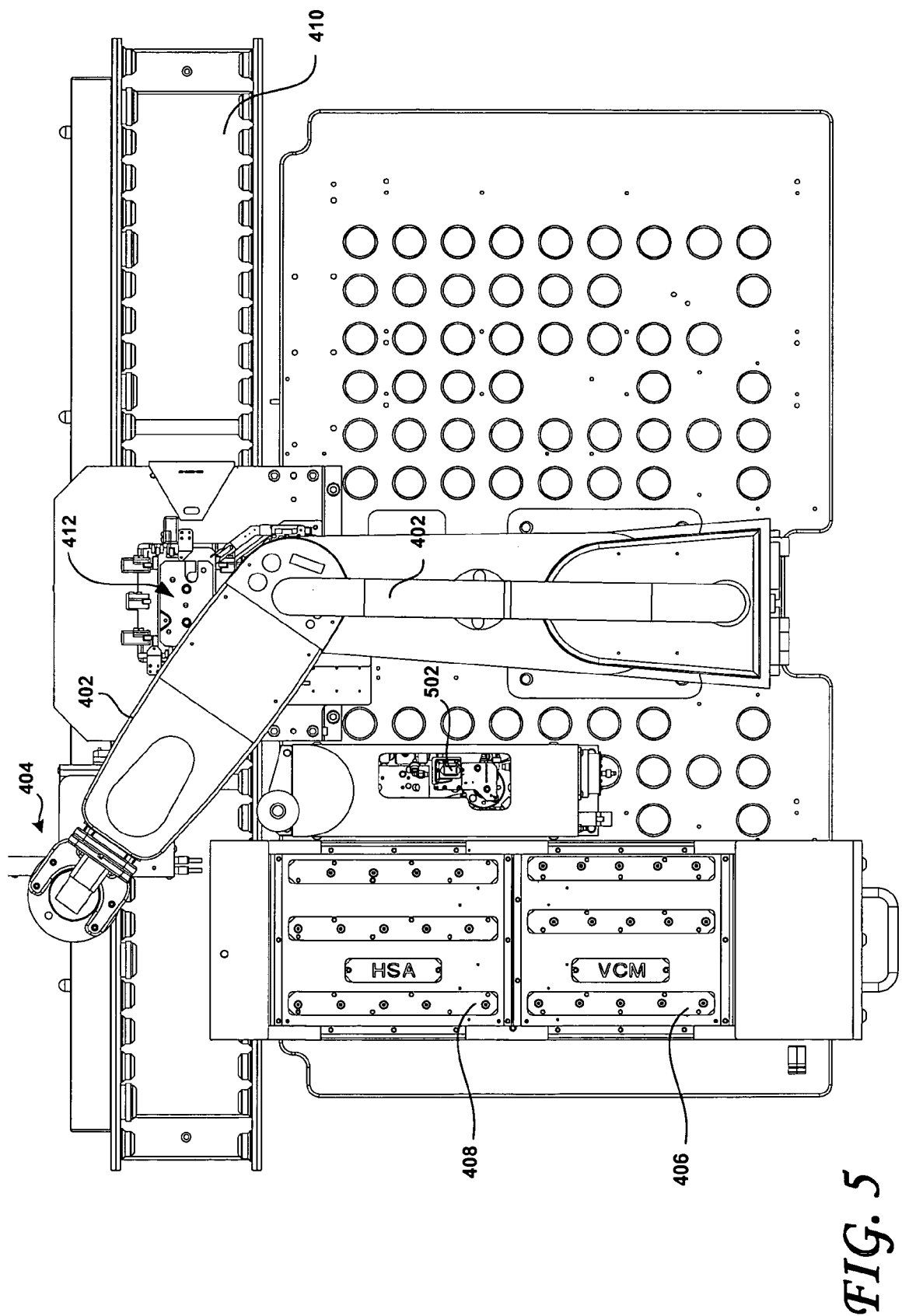
FIG. 5 shows a plan view of the disk drive assembly station of FIG. 4.

FIG. 4 shows a perspective view, and FIG. 5 shows a plan view of a portion of an assembly station 400 that includes a robotic tool 402 for assembling a portion of a disk drive, according to an embodiment of the present invention. The robotic tool 402 may be any portion of any type of robot, and, for example, may include a Selective Compliance Assembly Robot Arm (SCARA) robot, such as the Adept Cobra™ line of robots available from Adept Technology, Inc.

As shown therein, the assembly station 400 may include a disk drive assembly conveyor 410 by which disk drive bases and/or other components may be conveyed to the assembly station 400 for further processing.

The robotic assembly station 400 may further include a Voice Coil Motor (VCM) shipping tray receiving portion 406 and a HSA shipping tray receiving portion 408. The HSA shipping tray receiving portion 408 may be configured to receive a HSA shipping tray 102 such as that illustrated in FIGS. 1 and 2. Likewise, the VCM shipping tray receiving portion 406 of the assembly station 400 may be configured to receive a VCM shipping tray (not shown) that may be similar in construction to the HSA shipping tray 102 shown in FIGS. 1 and 2, but configured to receive a plurality of VCMs. Alternatively, HSAs and/or VCMs may be delivered to the assembly station 400 by other means. For example, the HSAs may arrive at the assembly station 400 by means of the disk drive assembly conveyor in a single or in multiple configurations and orientations. The HSAs and/or VCMs might also be manually delivered to the assembly station 400.

The assembly station 400 may further include (but need not so include) an HDA nest 412 to which disk drive bases, such as disk drive base 302, conveyed to the assembly station 400 may be coupled to complete one or more assembly steps. The assembly station 400 may also include a robotic tool 402 for assembling a portion of a disk drive. As best shown in FIG. 5, the assembly station 400 may also include a VCM air merge nest 502 that is configured to merge together an HSA and a VCM, such that the resulting assembly is suitable for coupling to the disk drive base.

The robotic tool 402 may, according to embodiments of the present invention, include an end effector 404 that is controllable and movable by the robotic tool 402. The body of the robotic tool 402 may be articulated (by servo motors for example) to selectively move the end effector 404 to, from and in between the VCM shipping tray receiving portion 406, the HSA shipping tray receiving portion 408, the air merge nest 502, the conveyor 410 and the HDA nest 412. The end effector 404 is preferably configured to selectively pick and place various disk drive workpieces between these locations within the disk drive assembly station 400.

A down-facing camera 414 may also be coupled to the end effector 404. The down-facing camera 414 may be configured to provide visual positional cues to a controller (not shown) of the robotic tool 402. The down-facing camera 414 may include, for example, a high resolution black and white progressive scan CCD (Charge Coupled Device) video camera such as the XC-HR70 available from Sony Corporation. The XC-HR70 features a ⅓" type IT progressive scan CCD and has a horizontal resolution of 1034 pixels and a vertical resolution of 779 pixels, enabling it to capture images at 29 f/s. Other video cameras may be used, and the optics thereof adapted to the specific requirements of the implementation at hand. Indeed, as would be clear to one skilled in the art, any means for capturing a preferably high-resolution image may be used. As also shown in FIG. 4, a telecentric lens 416 may be coupled to the down-facing camera 414 and a light source 418, such as a Diffuse On Access Light (DOAL) for example, may be coupled to the lens 416.

In addition, it should be understood by those skilled in the art that any suitable controller or processor may implement the functionality described herein. Indeed, the controller may comprise a plurality of microprocessors and controllers working to perform the desired functions. In one embodiment, the controller may comprise a microprocessor executing instructions, the instructions being operable to cause the microprocessor to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor. In yet another embodiment, the controller comprises suitable logic circuitry, such as state machine circuitry.

Figure 6:
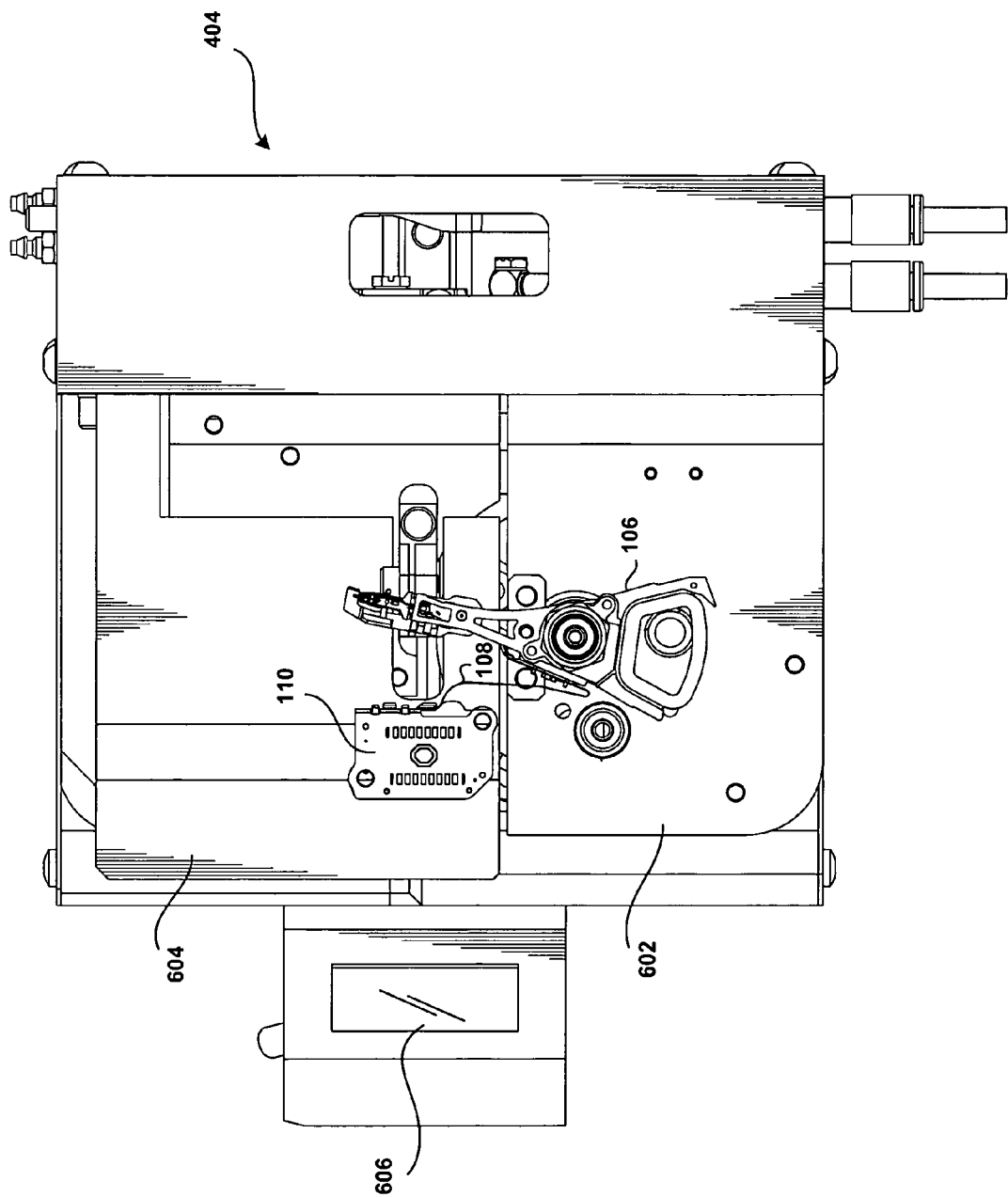
FIG. 6 shows a HSA coupled to an end effector of the robotic tool of FIG. 4.

FIG. 6 shows a HSA 106 coupled to the end effector 404 of the robotic tool of FIG. 4. Note that FIG. 6 does not show a VCM coupled to the HSA 106. As shown therein, the end effector 404 may include a first portion 602 and a second portion 604. The first portion 602 may be configured to engage the actuator assembly, and the second portion 604 may be configured to engage the FCC 110. According to an embodiment of the present invention, the second portion 604 of the end effector 404 may be configured to move relative to the first portion 602.

Figure 1:
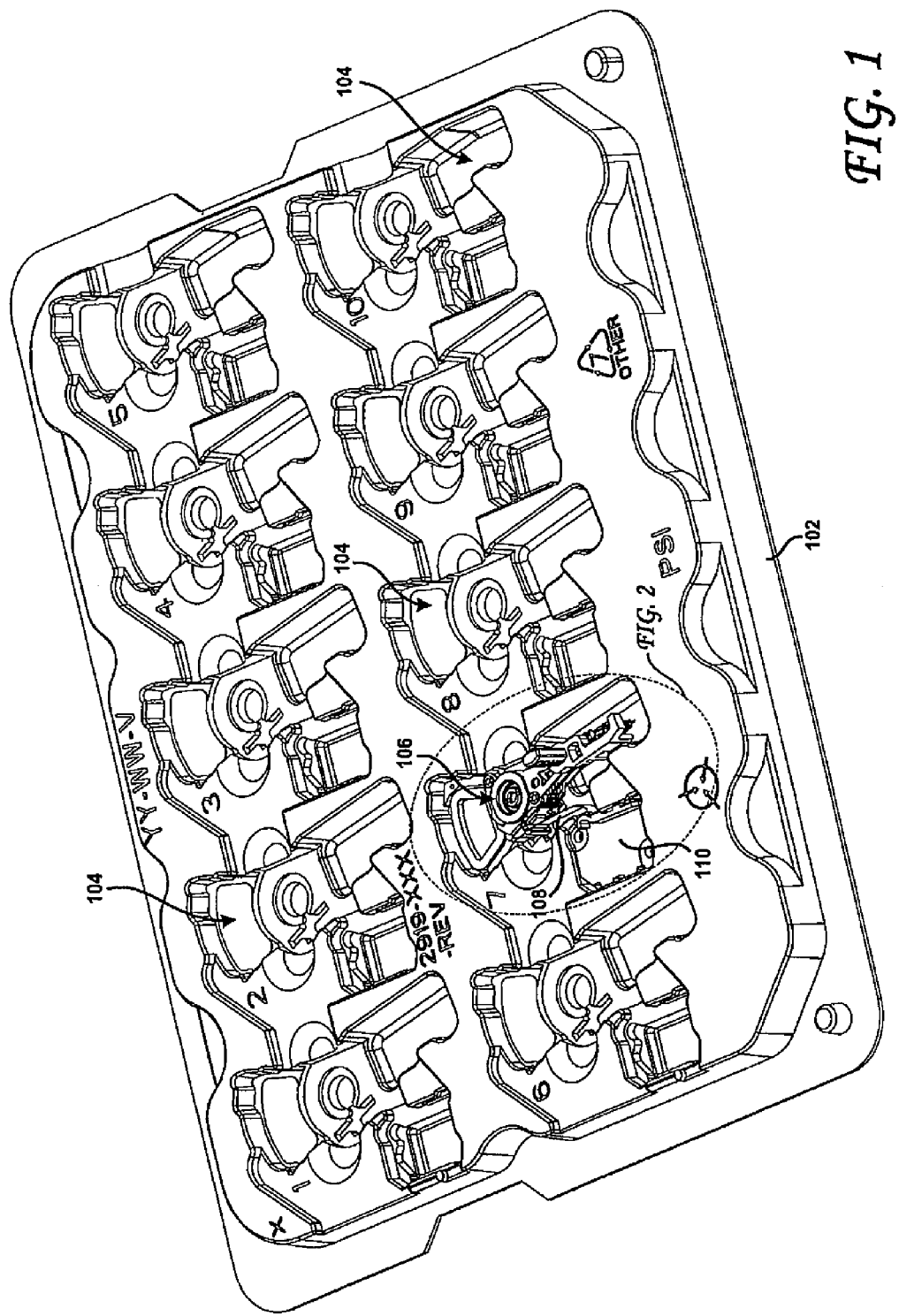
FIG. 1 shows an exemplary HSA shipping tray in which head stack assemblies may be shipped.
Figure 2:
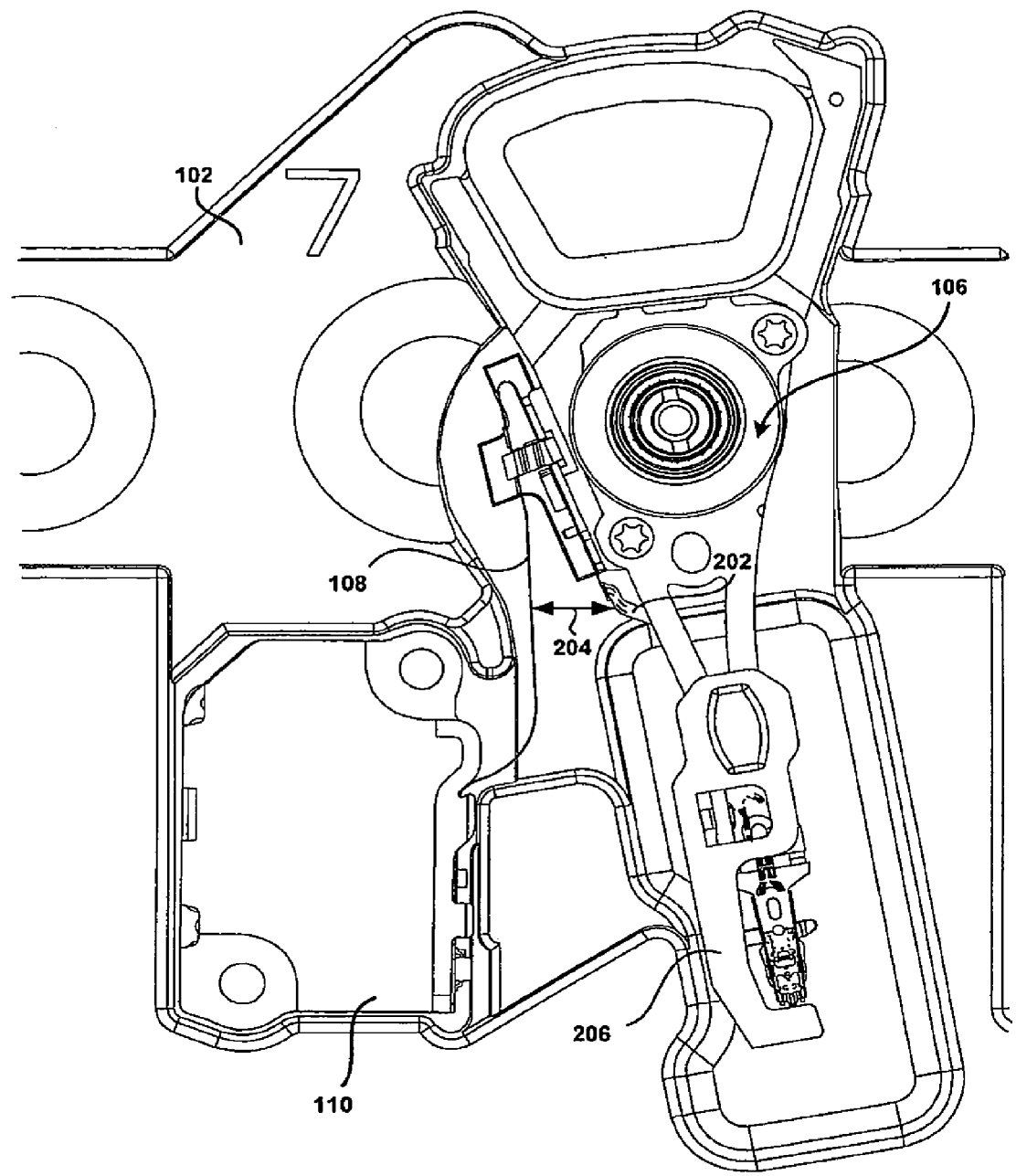
FIG. 2 is a plan view of a portion of the HSA shipping tray of FIG. 1, showing a head stack assembly received within a recess defined therein.
Figure 3:
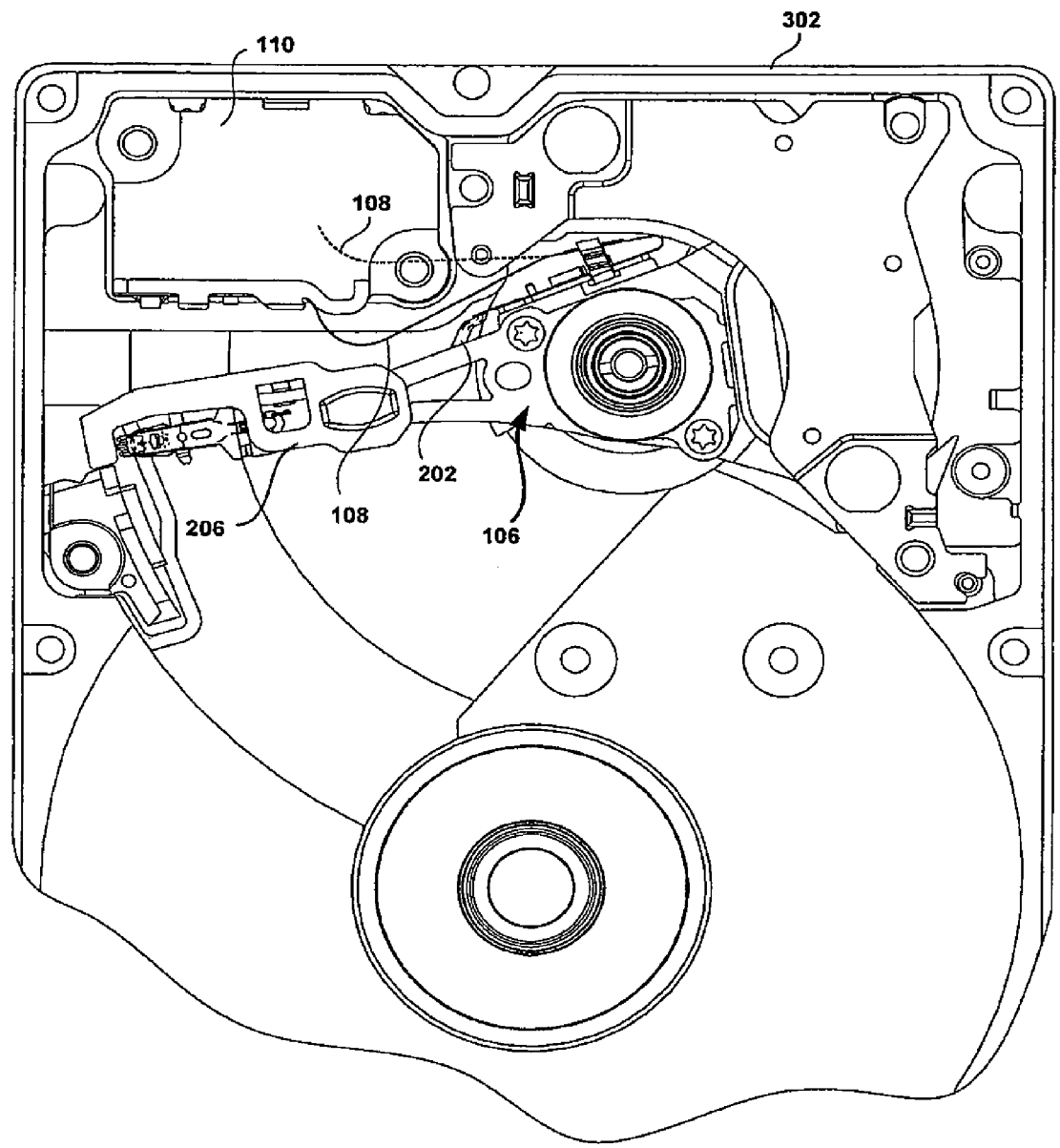
FIG. 3 shows an exemplary head stack assembly coupled to a base of a disk drive.

According to an embodiment of the present invention, the controller may be configured to control the end effector 404, and may be operable to cause the end effector 404 to move to the HSA shipping tray receiving portion 408 and to engage and pick up a HSA 106 from a HSA shipping tray 102 (shown in FIGS. 1 and 2 only). In other embodiments, of course, the end effector 404 may pick up a HSA 106 in any of a number of locations or orientations according to information gathered by the down-facing camera 414. To pick up the HSA 106, the robotic tool 402 may be controlled to position the down-facing camera 414 over the HSA shipping tray 102 and to record an image of the HSA 106. The end effector 404 may then be controlled to move over the imaged HSA 106, and a barcode reader 606 or other machine vision device coupled to the end effector 404 may read a barcode or other machine-readable indicia (if such is present) on the HSA.

The HSA 106, as detailed above, may be disposed within the shipping tray 102 in a first configuration. This first configuration may be that shown in FIG. 2, in which the flex circuit is generally disposed a distance 204 away from the tail stack 202 of the HSA 106. Other configurations of the HSA are, of course, possible. Herein, the term "actuator assembly" includes at least the assembly of the actuator arms and the actuator body, whether or not these form a unitary piece. The configuration in which the end effector 404 engages the HSA 106 may also be characterized as the shipping configuration of the HSA 106.

The end effector 404 is typically moved to a position vertically adjacent the HSA 106. Vacuum may then be turned on to couple the FCC 110 to the second portion 604 of the end effector 404, through a suction cup fitted to the second portion 604, for example. The first portion 602 may engage and couple the HSA 106 through engagement of, for example, two or more fingers of a pneumatic air gripper coupled to the first portion 602 of the end effector 404. Suitable air grippers may be obtained from, for example, SMC Corporation of America of Indianapolis, Ind. A three finger pneumatic air gripper from SMC is the MHR3-10R model. The MHR3-10R model operates by moving the tooling fingers apart by pneumatic pressure. However, air grippers are also available in rotary driven, two, three and four finger parallel styles that are effective to reliably grip and center workpieces (such as HSAs, for example). Other available models include wide opening parallel models; angular models having a speed adjustment built in; models having a toggle to give reliable gripping support; models suitable for clean room or low-contamination environments that are equipped with a protective boot, etc. Other types of grippers, actuated by hydraulic, electrical or piezo-electrical means (for example), may be used as well.

The pneumatic air gripper coupled to the first portion 602 may mechanically grip a pivot assembly (or one or more of the constituent sub-components thereof) of the HSA 106 at, for example, a corresponding engagement feature defined in or about the shaft of the HSA 106. In one embodiment, for example, first and second fingers of first portion 602 may be moved in order to mechanically grip the pivot assembly of the actuator assembly. A number of different pneumatic air grippers and corresponding features defined within the pivot assembly of the HSA are disclosed in commonly assigned and co-pending U.S. patent application Ser. No. 11/257,368 entitled "Tooling Mandrel For Assembling A Disk Drive And Method Of Using The Same" filed on Oct. 24, 2005, the disclosure of which is incorporated herein by reference. According to one embodiment of the present invention, the second portion 604 of the end effector may engage and couple to the FCC 110 through suction, although other mechanisms for coupling the FCC 110 to the second portion 604 may readily be implemented. Indeed, the end effector 404 may comprise any of a number of different designs used to manipulate workpieces. In one embodiment, the end effector comprises a single, articulable grasping mechanism. Preferably, this grasping mechanism is capable of grasping at least two objects (e.g., an actuator assembly and FCC) and manipulating these objects independently. In another embodiment, the end effector may comprise at least two vacuum connections that are independently movable. In the preferred embodiment, the end effector comprises first and second portions that are movable relative to one another.

The end effector may then be controlled to rise vertically away from the HSA shipping tray 102 with the entire HSA 106 gripped in the first configuration (e.g., the same configuration in which the HSA 106 was disposed in the shipping tray 102). According to an embodiment of the present invention, now that the HSA 106 is engaged and coupled to the first portion 602, the FCC 110 is coupled to the second portion 604 of the end effector 404 and the end effector has cleared the shipping tray 102, the second portion 604 may be moved relative to the first portion 602 of the end effector 404, so as to articulate the HSA 106 into a second configuration that is different than the first configuration. According to an embodiment of the present invention, this second configuration may be one in which the HSA 106 is in a configuration that is suitable for loading into a disk drive base.

Figure 7A:
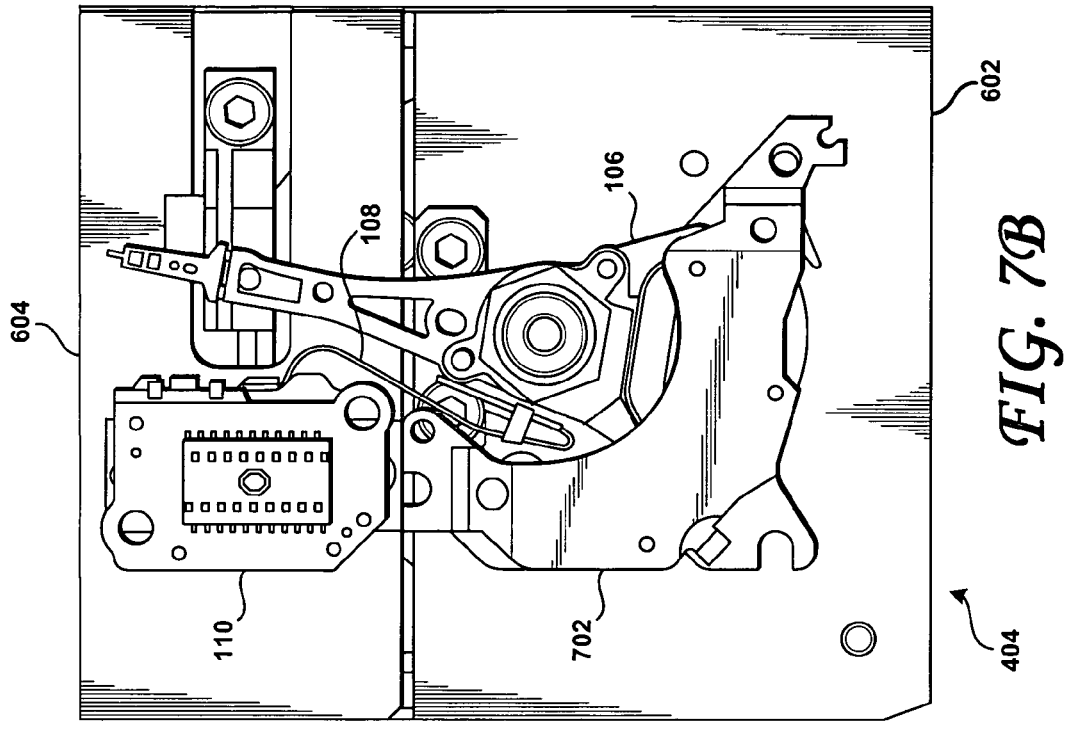
FIG. 7A shows the HSA disposed in a first configuration and coupled to the end effector of the robotic tool of FIG. 4, according to an embodiment of the present invention.
Figure 7B:
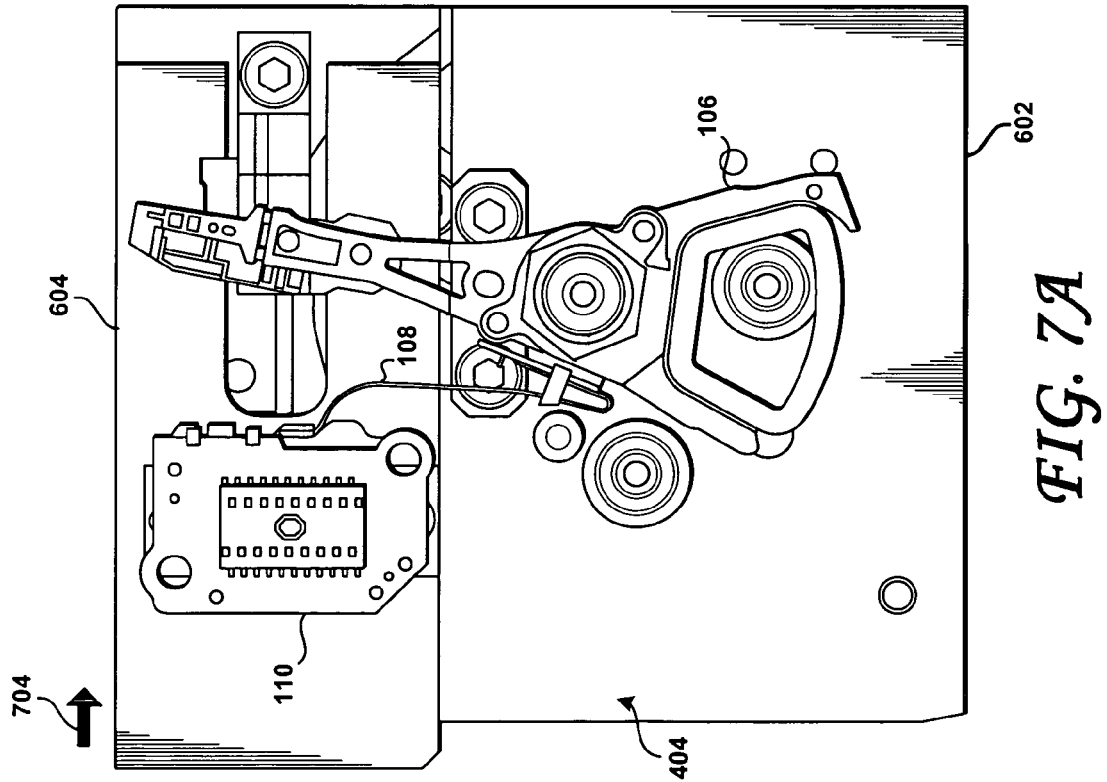
FIG. 7B shows the HSA of FIG. 7A disposed in a second configuration that is different than the first configuration and coupled to the end effector of the robotic tool.

Reference is now made to FIGS. 7A and 7B. FIG. 7A shows the HSA 106 coupled to the end effector 404 and disposed in the first (e.g., shipping) configuration, whereas FIG. 7B shows the HSA 106 coupled to the end effector 404 and disposed in the second (e.g., loading) configuration. To articulate the HSA 106 from the first configuration shown in FIG. 7A to the second configuration shown in FIG. 7B, the second portion 604 of the end effector 404 may be moved relative to the first portion 602 thereof. Thus, in one embodiment, the end effector 404 itself may be articulated to change the configuration of the HSA 106. As collectively shown in FIGS. 7A and 7B, moving the second portion 604 relative to the first portion 602, for example in the direction of arrow 704 in FIG. 7A, articulates the HSA 106 to a configuration that is suitable for coupling the HSA 106 to the disk drive base 302. In particular, moving the second portion 604 of the end effector 404 relative to the first portion 602, may move the FCC 110 closer to the actuator arms and actuator body of the actuator assembly of the HSA 106. In so doing, the FCC 110 may be moved closer to the actuator assembly of the HSA 106 in the second configuration of FIG. 7B than in the first configuration shown in FIG. 7A. That is, as shown in FIG. 7B, the flex circuit 108 may be brought into close proximity with the tail stack of the HSA 106 and into close proximity with other structures thereof. However, as the movement of the second portion 604 relative to the first portion 602 is precisely controlled, the flex circuit is less apt to come into contact with any structures of the actuator assembly of the HSA 106.

As a result of the movement of the second portion 604 relative to the first portion 602, the HSA 106 may be placed in a configuration that enables it to be placed into the base 302 of the disk drive being assembled. To place the HSA 106, the controller of the robotic tool may first control the end effector 404 to move to a position above and aligned with the HDA nest 412, where the disk drive base 302 has previously been moved. The controller may then cause the end effector 404 to place the HSA 106 into the base 302 while the base is coupled to the HDA nest 412. In one embodiment, the controller uses feedback from the down-facing camera 414 in order to manipulate the end effector 404 and thereby the HSA 106. In another embodiment, the base 302 may be moved to a position under the end effector 404, instead of moving the end effector 404 to a position over the base 302. The shipping comb 206 interdigitated between the suspensions of the HSA 106 may then be removed, thereby allowing a lift tab or tabs of the HSA 106 to come into contact with a ramp coupled to the base 302.

As described relative to FIG. 5, the robotic tool may include an air merge nest 502 that is configured to enable the HSA 106 to be merged with opposing magnets of a VCM, shown at reference number 702 in FIG. 7B. According to an embodiment of the present invention, prior to moving the second portion 604 relative to the first portion 602, and prior to placing the HSA 106 into the base 302, the end effector 404 may be controlled to place the HSA 106 into the air merge nest 502. Indeed, the robotic tool may be controlled to articulate the end effector 404 such that the coupled HSA 106 is in a third configuration, to release the actuator assembly into the air merge nest 502, and to shut off the suction such that the FCC 110 is no longer coupled to the second portion 604 of the end effector 404. The robotic tool may then control the end effector 404 to move away from the air merge nest 502.

The end effector 404 may then be moved to a position above the VCMs loaded in a VCM shipping tray disposed within the VCM shipping tray receiving portion 406 of the assembly station 400. The down-facing camera 414 may be used to record an image of a selected VCM within the VCM shipping tray. The end effector 404 may then be controlled to pick up the imaged VCM. The robotic tool may also move the end effector 404 to a screw feeder (not shown) to pick up a screw therefrom. While retaining the screw, the end effector 404 may be controlled to place the picked up VCM within the air merge nest 502, where the HSA 106 and the VCM are to be air merged. The end effector 404 may be controlled to carry out other functions, including, for example, picking and placing a pivot screw with which the HSA 106 is to be coupled to the base 302 and scanning a barcode or other machine-readable indicia on the HSA 106 or disk drive base 302.

The air merge nest 502 functions in a manner well known to those of skill in the art. Once the VCM and HSA are loaded therein, the VCM may be rotated such that the HSA fantail may slide between the two opposing magnets of the VCM. The air merge nest 502 may be provided with a pneumatic rotary device to rotate the VCM. The air merge nest 502 may then be controlled to cause the fantail to slide into the space between the two opposing VCM magnets. The HSA 106 may then be moved by a two-position air slide, and the VCM may be rotated back to a load position. In one embodiment, the HSA 106 may be in the first configuration during the air merge operation, while in other embodiments the HSA 106 may be in the second or other configurations during the air merge operation.

After air merge, the combined HSA and VCM assembly may be picked from the air merge nest 502 by the end effector 404. The down-facing camera 414 may then be controlled to move over the HDA nest 412. An image of the disk drive base 302 may then be taken and recorded by the camera 414, so that the correct placement of the combined HSA and VCM assembly may be determined. The retained screw may then be placed into an up-facing screwdriver (not shown) so that the retained screw may be driven through the base and into the pivot assembly of the HSA 106. The combined HSA and VCM assembly may then be placed into the base 302. The pneumatic air gripper may then be controlled to relax its grip on the pivot assembly of the HSA 106, and the suction holding the FCC 110 may be turned off. The end effector 404 may then be controlled to rise and clear the HDA nest 412 and the HDA captive therein.

What is claimed is:

1. A method for assembling a portion of a disk drive, the disk drive including a base and a head stack assembly, the head stack assembly including an actuator assembly, a flex circuit coupled to the actuator assembly and a flex circuit connector coupled to the flex circuit, the method comprising:
   providing a robotic tool having a robotic end effector;
   coupling the robotic end effector to the head stack assembly, the head stack assembly being disposed in a first configuration;
   articulating the robotic end effector to move the flex circuit connector relative to the actuator assembly, such that the head stack assembly is placed in a second configuration that is different than the first configuration;
   aligning the robotic end effector with the base; and
   placing the head stack assembly into the base.

2. The method of claim 1, wherein the flex circuit connector is closer to the actuator assembly in the second configuration than in the first configuration.

3. The method of claim 1, wherein the robotic end effector includes a first portion and a second portion that is movable relative to the first portion.

4. The method of claim 3, wherein coupling the robotic end effector to the head stack assembly includes:
   coupling the first portion of the robotic end effector to the actuator assembly; and
   coupling the second portion of the robotic end effector to the flex circuit connector.

5. The method of claim 4, wherein articulating the robotic end effector includes moving the second portion relative to the first portion to place the head stack assembly in the second configuration.

6. The method of claim 1, wherein coupling the robotic end effector to the head stack assembly includes coupling the robotic end effector to both the actuator assembly and the flex circuit connector.

7. The method of claim 6, wherein the actuator assembly includes a pivot assembly and wherein coupling the robotic end effector to the head stack assembly includes:
   moving first and second fingers of the robotic end effector to mechanically grip the pivot assembly of the actuator assembly; and
   applying suction through the robotic end effector to the flex circuit connector.

8. The method of claim 1, further comprising merging the head stack assembly with opposing magnets of a voice coil motor after coupling the robotic end effector to the head stack assembly and before placing the head stack assembly into the base.

9. The method of claim 8, wherein articulating is carried out after merging.

10. A method for assembling a portion of a disk drive using a robotic end effector, the disk drive including a base and a head stack assembly, the head stack assembly including an actuator assembly, a flex circuit coupled to the actuator assembly and a flex circuit connector coupled to the flex circuit, the method comprising:

coupling the robotic end effector to the head stack assembly, the head stack assembly being disposed in a first configuration;

articulating the robotic end effector, such that the head stack assembly is placed in a second configuration that is different than the first configuration;

aligning the robotic end effector with the base; and placing the head stack assembly into the base, wherein coupling the robotic end effector to the head stack assembly includes coupling the robotic end effector to both the actuator assembly and the flex circuit connector.

11. The method of claim 10, wherein the actuator assembly includes a pivot assembly and wherein coupling the robotic end effector to the head stack assembly includes:

moving first and second fingers of the robotic end effector to mechanically grip the pivot assembly of the actuator assembly; and applying suction through the robotic end effector to the flex circuit connector.

12. A method for assembling a portion of a disk drive using a robotic end effector, the disk drive including a base and a head stack assembly, the head stack assembly including an actuator assembly, a flex circuit coupled to the actuator assembly and a flex circuit connector coupled to the flex circuit, the method comprising:

coupling the robotic end effector to the head stack assembly, the head stack assembly being disposed in a first configuration;

articulating the robotic end effector, such that the head stack assembly is placed in a second configuration that is different than the first configuration;

aligning the robotic end effector with the base; and placing the head stack assembly into the base, wherein the robotic end effector includes a first portion and a second portion that is movable relative to the first portion, and wherein coupling the robotic end effector to the head stack assembly includes:

coupling the first portion of the robotic end effector to the actuator assembly; and coupling the second portion of the robotic end effector to the flex circuit connector.

13. The method of claim 12, wherein articulating the robotic end effector includes moving the second portion relative to the first portion to place the head stack assembly in the second configuration.

14. A method for assembling a portion of a disk drive using a robotic end effector, the disk drive including a base and a head stack assembly, the head stack assembly including an actuator assembly, a flex circuit coupled to the actuator assembly and a flex circuit connector coupled to the flex circuit, the method comprising:

coupling the robotic end effector to the head stack assembly, the head stack assembly being disposed in a first configuration;

articulating the robotic end effector, such that the head stack assembly is placed in a second configuration that is different than the first configuration;

aligning the robotic end effector with the base;

placing the head stack assembly into the base; and merging the head stack assembly with opposing magnets of a voice coil motor after coupling the robotic end effector to the head stack assembly and before placing the head stack assembly into the base placing.

15. The method of claim 14, wherein articulating is carried out after merging.

* * * * *

UNITED STATES PATENT AND TRADEMARK OFFICE
CERTIFICATE OF CORRECTION

PATENT NO. : 7,490,398 B2  Page 1 of 1
APPLICATION NO. : 11/359694
DATED : February 17, 2009
INVENTOR(S) : Klassen et al.

It is certified that error appears in the above-identified patent and that said Letters Patent is hereby corrected as shown below:

Column 10, Line 31: After "base" delete "placing".
(Claim 14, Line 18)

Signed and Sealed this

Sixteenth Day of March, 2010

David J. Kappos
*Director of the United States Patent and Trademark Office*